United States Patent [19]

Rast

[11] Patent Number: 5,530,778

[45] Date of Patent: Jun. 25, 1996

[54] DIRECTION FINDING APPARATUS USING TUNABLE FIBER OPTIC DELAY LINE

[75] Inventor: Howard E. Rast, Solana Beach, Calif.

[73] Assignee: The United States of America as represented by the Secretary of The Navy, Washington, D.C.

[21] Appl. No.: 395,749

[22] Filed: Feb. 23, 1995

[51] Int. Cl.⁶ .................................................. G02B 6/28
[52] U.S. Cl. .................... 385/24; 250/227.12; 356/350
[58] Field of Search ........................... 385/24, 147, 128, 385/122; 250/227.12, 227.19; 356/350, 128, 345; 359/332, 188, 122, 134, 154, 160, 327

[56] References Cited

U.S. PATENT DOCUMENTS

| | | | |
|---|---|---|---|
| 3,988,614 | 10/1976 | Kapron et al. | 250/227.12 |
| 3,991,417 | 11/1976 | Levine | 250/227.12 |
| 4,164,373 | 8/1979 | Schuss | 356/316 |
| 4,671,604 | 6/1987 | Soref | 385/24 |
| 4,671,605 | 6/1987 | Soref | 385/24 |
| 5,101,455 | 3/1992 | Goutzoulis | 385/24 |

OTHER PUBLICATIONS

"A Fiber–Optics Matched Delay Filter for RF Direction Finding"; Journal of Lightwave Technology, vol. LT–3, No. 2, Apr. 1985.
NOSC–TR 1161, "Ultra–Wideband Direction Finding Using Fiber Optic Transversal Filters", S. A. Pappert, Mar. 1987.
"Fiber– Optic Delay Line Technology For Wideband Signal Processing", S. A. Pappert, Optical Electronics Branch, Naval Ocean Systems Center (No Date).
"Ultra–wideband direction finding using a fiber optic beamforming Processor", Stephen A. Pappert, Naval Ocean Systems Center, San Diego, Ca (No Date).
"A Fiber–Optics Matched Delay Filter For RF Direction Finding", Journal of Lightwave Technology, vol. LT–3, No. 2, Apr. 1985.
"A Fiber Optic Beamforming Processor For Wideband Direction Finding", Stephen A. Pappert, Naval Ocean Systems Center, San Diego, CA (No Date).
NOSC–TR 1161, "Ultra–Wideband Direction Finding Using Fiber Optic Transversal Filters", S. A. Pappert, Mar. 1987.

*Primary Examiner*—Akm E. Ullah
*Attorney, Agent, or Firm*—Harvey Fendelman Thomas; Glenn Keough; Eric James Whitesell

[57] ABSTRACT

A direction finding apparatus and method for an RF signal are described which provide a variable time delay in fiber optic cables. A tunable transmitter launches optical emissions of several wavelengths into a plurality of fiber optic cables. Since the waveguide material of each cable exhibits anomalous dispersion of the optical emissions, large changes in group refractive index are provided as a function of the different wavelengths of the optical emissions. As a consequence, only small changes in the different wavelengths of the optical emissions produce large changes in the time delay of the different wavelengths of the optical emissions within a fixed length of the optical fiber cables. This apparatus and method produce sensitive angle of arrival determinations for RF signals.

14 Claims, 2 Drawing Sheets

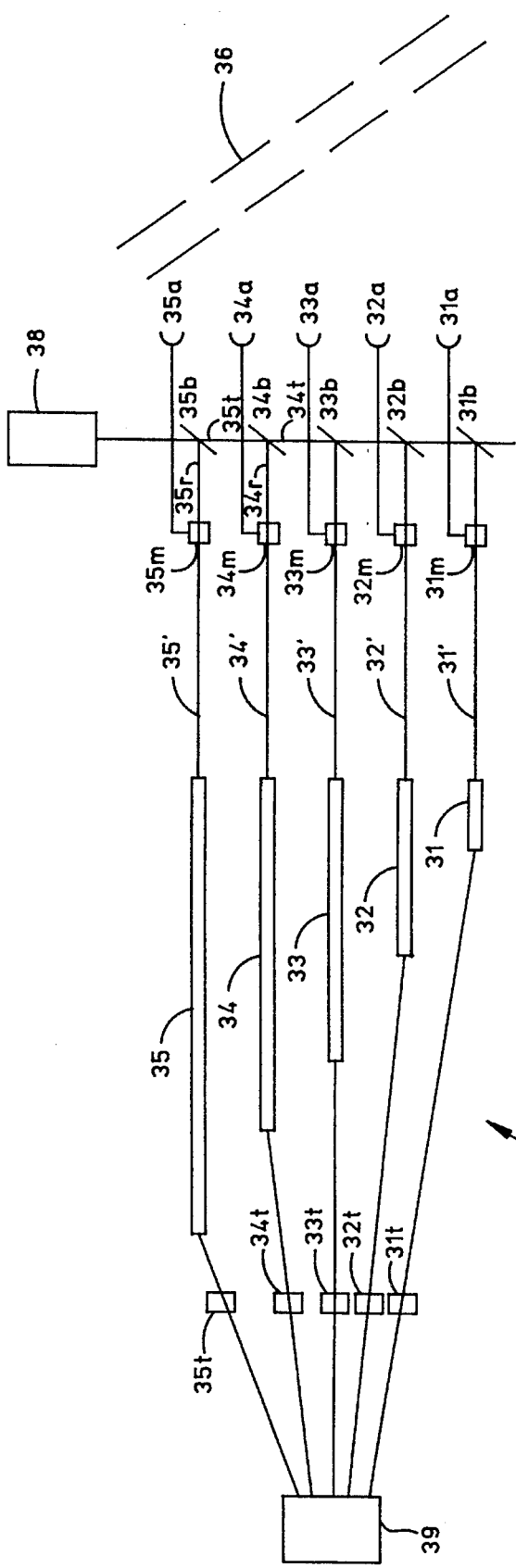
FIG. 3
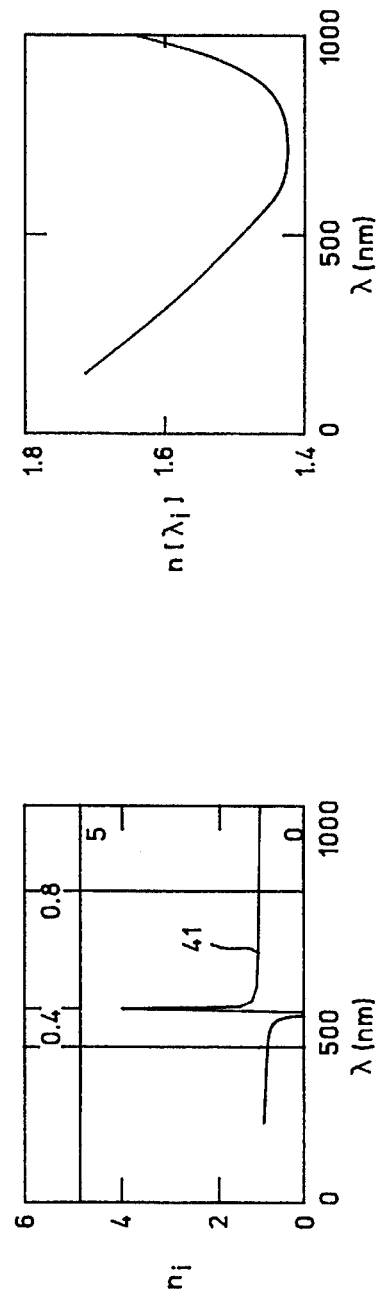
FIG. 4
FIG. 5

DIRECTION FINDING APPARATUS USING TUNABLE FIBER OPTIC DELAY LINE

STATEMENT OF GOVERNMENT INTEREST

The invention described herein may be manufactured and used by or for the Government of the United States of America for governmental purposes without the payment of any royalties therein or therefor.

BACKGROUND OF THE INVENTION

The present invention relates generally to direction finding using a continuously variable time delay line, and more generally to the field of fiber optics.

In addition to their use as the transmission medium in telecommunications systems, optical fibers are useful for radar signal processing, particularly where large time-bandwidth products and/or electromagnetic interference immunity are required. By employing taps along the length of a fiber in various configurations, several signal processing devices such as band pass filters, discriminators and code generators/matched filters can be implemented.

One technique for passive RF direction finding is based on the interferometric detection of RF phase delays using an antenna array. This technique, however, is highly frequency dependent. This problem can be overcome by using the tapped fiber optics matched delay filter which operates in the time delay mode rather than the phase delay mode. This approach yields RF arrival directions which are independent of frequency. Since it operates in the time delay mode, the fiber optic filter for direction finding is frequency independent over a very large range.

The use of optical fibers as delay lines is well documented. See, for example, S. A. Pappert, M. N. McLandrich, and C. Chang, *Journal of Lightwave Technology*, Vol. LT-3, p. 273, Apr. 1985. The delay incurred by an optical pulse propagating through a fiber of given length is based on the transit time. By launching a pulse of light into a fiber, the transit time of the pulse through the fiber results in a delay equal to the transit time for transmission. Another method creates twice the transit time and relies on reflection. Both methods have been used to create time delays for various applications. Since the length of the fiber is fixed, the temporal delay is determined by the speed of light in vacuum and the group index of refraction.

The group index $N_g$ can be approximated by the following equation $$N_g = n_\lambda \left[ 1 - \frac{\lambda}{n_\lambda} \frac{dn_\lambda}{d\lambda} \right] \quad (1)$$

where $n\lambda$ is the refractive index of the fiber at the wavelength $\lambda$ and $dn_{go}/d\lambda$ is the dispersion of the fiber waveguide material contained in the fiber core. Dispersion is the change in the refractive index with wavelength. It can be readily seen from the above equation that variations in the group index are a result of dispersion of the fiber waveguide material. Thus a variable time delay can be obtained with a fixed length of optical fiber by changing the wavelength of the light pulse propagating through the fiber.

A patent by Soref, U.S. Pat. No. 4,671,604, describes a wavelength dependent tunable optical time delay technique using simple dispersion. By varying the wavelength of the pulse, a variable time delay can be obtained with a fixed length of optical fiber. The Soref patent proposes using high dispersion waveguide material in the optical fiber. A single, discretely tunable optical source is used to produce wavelength tuning. This technique does not allow continuous wavelength tuning, and therefore only stepwise variations in the optical delay are achieved.

A patent by Goutzoulis, U.S. Pat. No. 5,101,455, describes a tunable fiber optic delay line in which an array of discrete optical sources is used, each producing a different wavelength. The requirement of numerous individual optical sources precludes continuous tunability and therefore precludes continuous variation of the delay time. Additional complications of the technique described by Goutzoulis involves the complexity of fabricating the array of fibers and the difficulty of producing a laser array with the proper wavelength emissions.

A fiber optic variable delay line was described by Soref in U.S. Pat. No. 4,671,605. A plurality of optical fibers of varying lengths was used to produce a variable delay. The time of travel of the optical signal is determined by which fiber the optical signal passes through. The practicality of such a technique is limited by the requirement that many fibers have to be cut to precise lengths and the reliance upon numerous bidirectional coupling elements.

A patent by Schuss et al., U.S. Pat. No. 4,164,373, describes a fiber optic spectrometer that is used to spectrally analyze the wavelength content of a pulsed light source. The broadband light from the source is dispersed prior to entering a plurality of optical fibers. The spectrometer is designed so that each optical fiber transmits a different wavelength band emitted by the source. All fibers are the same physical length. Owing to dispersion, the optical packets transmitted by each fiber arrive at the detector at different times. This technique therefore provides a wavelength-to-time conversion technique which can be used to determine the spectral content of the pulsed source.

A patent by Kapron et al., U.S. Pat. No. 3,988,614, describes a technique for compensating the dispersion introduced by transmission of a broad spectral pulse in an optical fiber. In this technique the pulse spreading caused by dispersion is corrected by applying different time delays to the optical signals representing different wavelengths. If a broad spectral pulse of short duration is propagated through an optical fiber, dispersion introduces wavelength dependent delays for each spectral component of the pulse. The result of this is that a temporally broadened pulse emerges from the fiber. In the Kapron patent, the broadened pulse is dispersed, and each wavelength band is directed to a separate optical fiber. The length of each fiber is adjusted to introduce a compensating delay for a given band of wavelengths. In this manner the difference in pulse delay experienced by each wavelength band in the initial fiber transmission can be canceled.

Chromatic dispersion is a result of the variation of the group velocity of light with wavelength. The dispersion in a fiber optic is due to the dispersion of the material composing the waveguide. For light in the 850 nm to 900 nm range, the differential delay over a 10 nm spectral bandwidth is about 1 ns per km of fiber. This delay is calculated for fused silica, a commonly used waveguide material for optical fibers. Other waveguide materials may have higher dispersion and differential delays of 2 ns per km or more can be obtained. Using the relatively broad spectral emission of a light emitting diode (LED) as an example, a spreading of 2 to 10 ns per km can occur in a fused silica optical fiber.

In an optical fiber light travels approximately 20 cm/ns. An incremental delay of 1 ns would therefore require 20 cm of additional fiber. Alternatively, for a 1 km long fused silica fiber, an incremental delay of 1 ns requires that the spectral source tune over a range of 10 nm. Higher dispersion optical waveguide material might require only 5 nm of tuning for a 1 ns incremental delay.

Laser diodes, which are a convenient and widely used transmitters for fiber optics, cannot tune over a wavelength range greater than a few nm unless the junction temperature is varied. Unfortunately, changing the junction temperature is a slow process. Therefore, for rapid wavelength tuning, current control is a more appropriate technique.

Cleaved coupled cavity laser diodes, which are substantially more complicated and expensive than "ordinary" laser diodes, can produce tuning ranges of 30 nm or more. For a fused silica fiber this would provide approximately 3 ns of incremental delay, while for more dispersive waveguide materials as much as 6 ns incremental delay might be achieved. In either event, using the techniques described above to achieve incremental time delays exceeding several ns would require a large number of fibers of varying lengths. In addition, a laser diode or other optical source that is capable of a wide tuning range would be required.

Therefore, a need exists in the state of the art for producing a directional finding apparatus using a continuously variable time delay line which can produce large incremental time delays with small changes in wavelength and is convenient to use with an ordinary laser diode optical source.

SUMMARY OF THE INVENTION

The present invention is directed to providing a direction finding apparatus which uses a continuously variable, fiber optic time delay line. A novel feature of this inventive concept provides significantly increased dispersion in the waveguide material or transmission medium used in the optical fiber. High dispersion is achieved by the process known as anomalous dispersion, which produces high dispersion over a relatively narrow wavelength range. In this process, large changes in the index of refraction are realized in the spectral vicinity of an optical absorption band of the transmission medium.

BRIEF DESCRIPTION OF THE DRAWINGS

FIG. 3 illustrates a first embodiment of this invention concept.

FIG. 4 illustrates the variation of refractive index of a transmission medium as a function of emission wavelength near an optical absorption band of the transmission medium.

FIG. 5 represents the variation of group refractive index as a function of emission wavelength over the wavelength range of 200 nm to 1 μm for fused silica.

DETAILED DESCRIPTION OF THE PREFERRED EMBODIMENT

This inventive concept involves a direction finding apparatus employing a continuously variable fiber optic delay line. The phenomenon of anomalous dispersion is relied upon to provide high dispersion at the emission wavelength of the optical source. The emitted wavelength of the optical source or transmitter may be continuously or discretely variable, and may be either CW or pulsed optical radiation. The wavelength range over which the direction finding apparatus operates is determined by the nature of the optical transmitter and the waveguide material used in the optical fiber. The optical transmitter produces emission near an optical absorption band of the material used in the fiber optic waveguide. Compared to the case where standard chromatic dispersion is used to vary the time delay of a given length of fiber, the anomalous dispersion in the spectral region near the absorption band allows efficient operation using both a narrower tuning range for the transmitter and fewer fiber optic cables to achieve a given range of optical delay.

Figure 1:
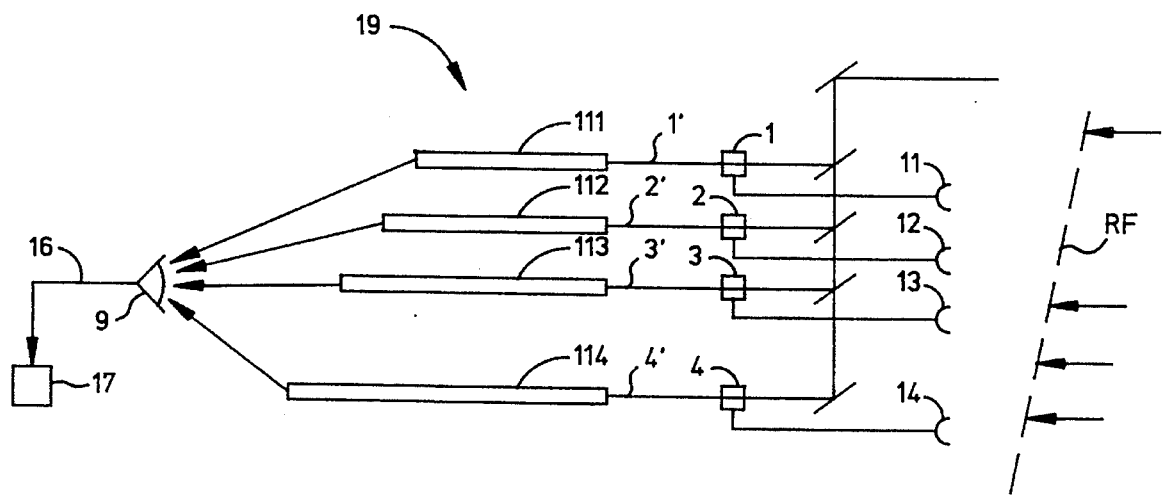
FIG. 1 is a schematic representation illustrating the basic principles of a direction finding apparatus utilizing a continuously variable fiber optic delay line.

Referring now to the drawings wherein like reference numerals designate identical or corresponding parts throughout the several views, and noting that none of the figures are drawn to scale, FIG. 1 illustrates the principles of this inventive concept. A direction finding apparatus 19 uses four exemplary continuously variable time delay lines 111, 112, 113, and 114. Directly modulated laser diodes 1, 2, 3, and 4 produce an amplitude modulated optical emission 1', 2', 3' and 4' in response to an incident RF wave received by antennae 11, 12, 13, and 14, respectively. The amplitude modulated optical radiation 1', 2', 3' and 4' emitted by laser diodes 1, 2, 3, and 4 is launched into optical fibers 111, 112, 113, and 114, respectively. The optical radiation transmitted by optical fibers 111 through 114 is incident upon a detector 9 which may be a photodiode or a photomultiplier tube. The photodiode or photomultiplier tube produces an electrical signal which is transmitted through electrical cable 16 and is amplified, processed and displayed by a standard electrical means 17 such as an oscilloscope or other suitable electronic processing and display device.

Typically, the amplitude modulation of each laser diode is not in phase. This is due to the fact that the RF plane wave detected by antennae 11, 12, 13, and 14 is at an arbitrary angle of incidence. Although the amplitude modulation from each laser diode is not necessarily in phase with the modulation from any other laser diode, there is an analytical, fixed phase relationship between each laser diode amplitude modulated emission. The phase relationship depends on the angle of incidence of the RF plane wave with respect to the antennae. Correcting the phase mismatch among the various laser diodes enables a determination of the angle of incidence, or direction, of the RF plane wave.

In the direction finding apparatus illustrated in FIG. 1, the optical signal recorded by detector 9 will be maximized when the modulated emission from laser diodes 1, 2, 3, and 4 are in phase. This is accomplished in a traditional direction finding apparatus by adjusting the lengths of fibers 111, 112, 113, and 114. The delay that is introduced along each transmission path through each respective fiber is adjusted to compensate for the transit time of the RF wave incident upon adjacent antennae.

Proper compensation for the RF delay produces beams that emerge from the respective fibers completely in phase.

As the lengths of fibers 111, 112, 113, and 114 are fixed, the incremental delay introduced by any given fiber with respect to any other fiber is simply related to the refractive index of the fiber and the additional length of the fiber. Optical fibers consist of a waveguide material surrounded by a cladding material. Optical fibers transmit optical radiation by total internal reflection. That is, the refractive index of the waveguiding material provides total internal reflection for a certain solid angle of radiation (which is related to the numerical aperture of the fiber) such that light incident at the waveguide-to-cladding interface at angles greater than a "critical angle" are reflected back into the waveguide material.

In the illustration shown in FIG. 1, the waveguide material is composed of an optical material that exhibits anomalous dispersion for the emission range of the wavelengths produced by lasers 1, 2, 3, and 4. Anomalous dispersion is a well-known phenomenon that produces large changes in the refractive index of a material in the spectral vicinity of an absorption line or optical resonance of a particular transmission medium. In such a case, the dispersion or change of refractive index with respect to the wavelength of a transmitted emission can be a factor of three or more higher than the (normal) dispersion that may be otherwise observed at a transmitted wavelength far removed from an absorption line or band.

Referring once again to FIG. 1, it can be seen that because the incremental length of any given optical fiber is fixed with respect to any other optical fiber, the incremental delay is fixed if the refractive index of the fibers is fixed. In order to maximize the signal at detector 9 for an arbitrary incident angle of RF wave on antennae 11 through 14, it is desirable to continuously vary the incremental optical delay introduced by each of the fiber optical cables 111 to 114. This can be done by taking advantage of the dispersion of the waveguiding material in the respective optical fibers. In particular, in this inventive concept optical fibers are used which exhibit anomalous dispersion at the wavelengths emitted by laser diodes 1 through 4. Therefore, the delay introduced by optical fiber 111, for example, can be varied significantly by small changes in the emitted wavelengths from laser diode 1.

The emission produced by laser diode 1 can be varied in a number of ways. For example, the junction temperature can be changed, the injection current density can be changed, or a cleaved coupled cavity laser diode can be used. In addition, numerous commercial, external cavity tunable laser diodes are currently available which are suitable for this inventive concept.

However, by reason of the phenomenon of anomalous dispersion in the fibers, relatively small changes in the emitted wavelengths can produce large incremental time delays. Therefore, the appropriate emitted wavelengths of laser diodes 1 through 4 can be readily selected to provide for the correct amount of temporal delay in the modulated output from each delay line 111, 112,113 and 114. This ensures that the optical signals transmitted by fibers 111, 112, 113, and 114 will be in phase at detector 9 to maximize the electrical signal produced by detector 9 for any arbitrary angle of incidence of an RF plane wave upon antennae 11 through 14.

Figure 2:
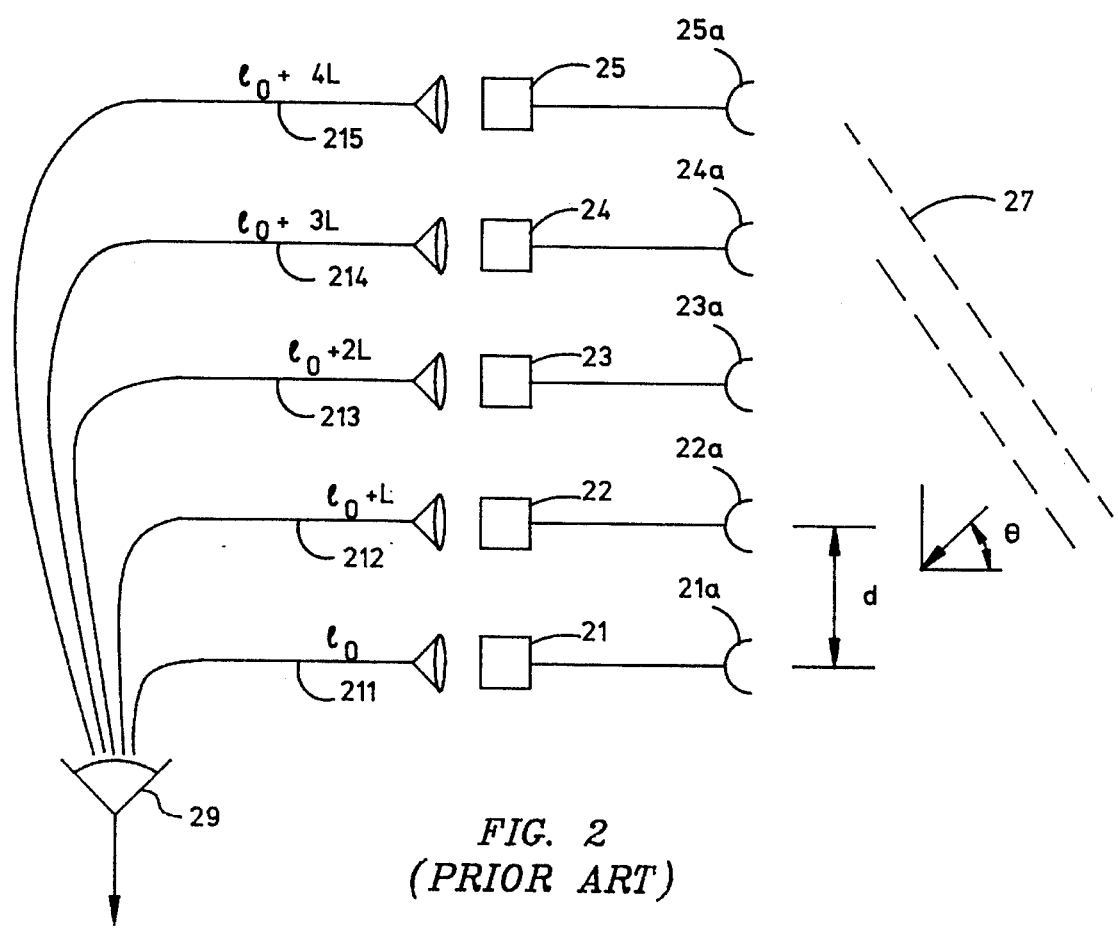
FIG. 2 illustrates the prior art of a single beam fiber optics matched delay filter for use in RF direction finding.

Referring now to FIG. 2, the principles of a single beam fiber optics matched delay filter for use in RF direction finding are illustrated. FIG. 2 illustrates the principles of a standard direction finding apparatus in which anomalous dispersion is not used. In this example of prior art, five modulated laser diodes, labeled 21, 22, 23, 24, and 25 are shown. The emission from each laser diode is launched into optical fiber cables 211, 212, 213, 214, and 215, respectively. An RF plane wave produces a phase front 27 incident upon antennae 21a, 22a, 23a, 24a, and 25a. The signal detected by each antenna produces a modulated drive current to each laser diode, which in turn produces an amplitude modulation in the emission of laser diodes 21, 22, 23, 24, and 25. The modulation produced in each laser diode is in phase with the sinusoidal amplitude variation of the RF wave detected by each antenna.

Phase front 27 is incident upon antennae 21a through 25a at an arbitrary angle of incidence θ. The spacing between adjacent antennae is d. The RF time of arrival difference between adjacent antennae in the antenna array is given by (d sin θ)/c, where c is the speed of light and θ is the azimuthal angle of incidence for the RF wave measured from the normal to the array as illustrated in FIG. 2. The electrical current from each omnidirectional antenna 21a through 25a in FIG. 2 modulates the optical power of the individual laser diodes 21 through 25, respectively. The optical fibers are cut to specific lengths $l_o+NL$, where N is an integer. The adjacent fiber length difference of L produces the delays required to compensate for the time of arrival differences of the incoming RF signal at each antenna.

The time delay difference for propagation through adjacent fibers is $n_g L/c$ where L is the length of the optical fiber and $n_g$ is group index. The optical power from the fiber optic delay lines is incoherently summed on a high speed detector 29 which may be, for example, a photodiode. The detector current is proportional to the total optical power incident on the detector. Analyzing the angular dependence of the detected optical signal, the direction of arrival of the incident RF signal can be deduced.

The time difference τ for emission from adjacent fibers includes the RF arrival time difference for adjacent antennae, and the fiber optic time delay for adjacent fibers, and is given by $$\tau = \frac{n_g L - d \sin\theta}{c} . \quad (2)$$

When τ=0 the optical detector output will be at a maximum. This occurs for the angle of incidence $\theta_o$ satisfying the condition $$\sin \theta_o = \frac{n_g L}{d} . \quad (3)$$

It is required that the frequency of the incident RF plane wave be less than c/2d for $\theta_o$ to be unique in the range of $-\pi/2$ to $\pi/2$ radians.

The limitations inherent in the prior art direction finding apparatus of FIG. 2 are obvious. In order to maximize the signal at photodetector 29, numerous fiber optic delay lines are required for each laser diode. See, for example, the paper by S. A. Pappert et al. referenced above. In addition, continuous variation of the optical delay, which is required by Eq. 3 to achieve the true maximum detector signal for an arbitrary $\theta_o$, is not practical with the prior art of FIG. 2.

FIG. 3 illustrates a first embodiment of this inventive concept. An exemplary direction finding apparatus 37 is composed of a tunable laser 38, five antennae 31a, 32a, 33a, 34a, and 35a, five beamsplitters 31b, 32b, 33b, 34b, and 35b, five optical amplitude modulators 31m, 32m, 33m, 34m, and 35m, five fiber optic cables 31, 32, 33, 34, and 35, and an optical detector 39, which may by a photodiode or photomultiplier tube, or other appropriate device. The emission of tunable laser 38, which may be a laser diode or other suitable tunable laser, is propagated towards beamsplitter 35b. A fraction of the laser intensity incident upon beamsplitter 35b is reflected along path 35r to modulator 35m. The remainder of the intensity is transmitted through beam splitter 35b and continues along path 35t to beam splitter 34b. Part of the intensity incident upon beamsplitter 34b is reflected along path 34r, while the remainder of the intensity is transmitted along path 34t. The other beamsplitters 33b, 32b, and 31b reflect part of the intensity to optical modulator 33m, 32m or 31m, respectively, while transmitting remainders of the intensity to the next sequential beam splitter.

The radiation reflected along path 35r is transmitted through modulator 35m. Laser radiation 35' is amplitude modulated laser radiation that enters optical fiber 35. Typically, the amplitude modulation of laser radiation 35' will be periodic, although other types of modulation are compatible with this inventive concept Similarly, radiation 34', 33', 32', and 31', are amplitude modulated and enter fibers 34, 33, 32, and 31, respectively.

The phase of amplitude modulated signal 35' is determined by the amplitude modulation attributed to plane wave 36 that is incident upon antenna 35a. Plane wave 36 could be, for example, an RF transmitted wave. Similarly, the phase of the modulated signal 34' is determined by the modulation by the plane wave incident upon antenna 34a, and so on, for amplitude modulated signals 33', 32', and 31'.

The waveguiding material in optical fibers 31 through 35, in this exemplary case, is selected to exhibit anomalous dispersion at the wavelength emitted by tunable laser 38. For example, fused silica could be appropriately doped with a dopant such as sodium.

Anomalous dispersion is illustrated in FIG. 4, which shows a plot of the refractive index of an appropriate transmission material as a function of the transmitted wavelength $\lambda$. At a wavelength of approximately 500 nm, the material has an intense and narrow absorption band. As can be seen from curve 41, the change in refractive index at wavelengths slightly longer than 500 nm is quite large. This greatly increased change is attributed to the phenomenon known as anomalous dispersion. Depending on the selection and doping of the waveguide material, the wavelength range over which anomalous dispersion dominates the variation of refractive index with wavelength can be as much as ±100 nm. The refractive index illustrated by curve 41 changes from approximately 4 to approximately 1.5 as the wavelength increases from approximately 500 nm to 600 nm. The time delay introduced by a given length of fiber is determined by the product of the group refractive index times the physical length of the fiber. Therefore, changing the refractive index by a factor of 2 allows the time delay to be changed by a factor of 2 for a fixed length of fiber. This is accomplished in this inventive concept simply by small changes in the wavelength of the emission of tunable laser 38.

An advantage of the embodiment of FIG. 3 which relies on anomalous dispersion is that only one tunable laser is required. This greatly simplifies the electro-optic requirements for direction finder 37 relative to that of the prior art illustrated in FIG. 2, and ensures that the wavelength of light propagating through exemplary optical fibers 31 through 35 is identical. Furthermore, the use of external modulators 31m through 35m offers an additional benefit. As is well known, the wavelength of emission of a laser diode is dependent upon the injection current. By modulating the laser diodes directly, as is done in the prior art illustrated in FIG. 2, changes on the order of several tenths of a nm can occur in the laser diode emissions. This "tuning" is a consequence of changes in the refractive index of the junctions of the laser diodes.

In the inventive concept illustrated in FIG. 3, however, tunable laser 38, which may be a laser diode, operates at a fixed frequency and may be continuous wave (CW) emission. Amplitude modulation by modulators 31m through 35m affect the amplitude but not the wavelength of the emission launched into fibers 31 through 35, respectively. Each modulator is controlled by an amplifier which derives its modulation power and phase from a corresponding antenna element. The splitting ratio of beamsplitters 31b through 35b can be adjusted so that the reflected intensities of the emission from tunable laser 38 into modulators 31m through 35m are nearly identical. For example, the ratio of reflected radiation on path 35r to transmitted radiation on path 35t, produced by beamsplitter 35b, can be one to four. In this case, twenty percent of the emitted light from tunable laser 38 is reflected towards modulator 35m. The ratio of reflected to transmitted radiation produced by beam splitter 34b should then be one to three. That is, twenty-five percent of the radiation on path 35t to beam splitter 34b would be reflected so that the radiation intensity along path 34r is identical to that produced along path 35r. This procedure can be followed for the other beamsplitters. One design might have the final beamsplitter 31b reflecting all incident light to modulator 31m, in which case the beamsplitter would actually be a highly reflective mirror. Having comparable intensities along paths 31' through 35' is not a strict requirement of this inventive concept, but such intensities do produce a higher sensitivity for direction finding at detector 39.

Since anomalous dispersion is produced by the existence of an optical absorption of radiation in the waveguiding material of the fiber, some absorption loss may be introduced into each beam as a result of propagation through the optical fiber. A compromise must be reached between maximizing the dispersion and minimizing the absorption loss. Referring once again to FIG. 4, it is clear that the dispersion is highest close to the center of the absorption resonance, where the absorption is highest as well.

Absorption by the optical fibers not only reduces the signal intensity at detector 39, but, because the lengths of fibers 31 through 35 are not equal, the absorption losses will differ for the various fibers. Since, as noted above, this differing transmitted intensity adversely affects the sensitivity of direction finding apparatus 37, variable attenuating means 31t through 35t can be introduced in each optical path so that the optical signal intensity from each path reaching detector 39 is nearly identical. Alternatively, the splitting ratios, that is, the ratio of transmitted to reflected power, can be adjusted for each beamsplitter to compensate for greater absorption along the longer fibers. In this case, rather than determining the splitting ratio to provide comparable optical power to modulators 31m through 35m, the splitting ratio can be adjusted by the beamsplitters to provide comparable power along each path to detector 39.

Radiation emerging from each optical fiber can be directed towards detector 39 through additional low dispersion fibers or optical mirrors or other suitable means. Variable attenuators 31t through 35t can be incorporated into direction finder 37 in locations other than those illustrated in FIG. 3. For example, the attenuators can be incorporated into modulators 31m through 35m or placed before optical fibers 31 through 35.

To compare the advantage that anomalous dispersion produces in this inventive concept as compared to normal dispersion, the dispersion of fused silica between 200 nm and 1000 nm is illustrated in FIG. 5. Fused silica is a common material used in the waveguiding region of an optical fiber.

Over a 50 nm range between 500 nm and 550 nm the refractive index drops from 1.514 to 1.484, or approximately 2%. Fused silica does not exhibit anomalous dispersion over this wavelength range. However, referring once again to FIG. 4, it can be seen that over the range of approximately 520 nm to 550 nm the refractive index of the appropriately doped transmission medium drops by more than a factor of two, showing the great advantage of anomalous dispersion. Note that the plot 41, illustrated in FIG. 4, is schematic and for illustration purposes only.

In accordance with this inventive concept a direction finding apparatus uses a continuously variable time delay line having a tunable laser diode and the technique of chromatic dispersion. A waveguide material in the optical fiber is used which exhibits anomalous dispersion in the emitted wavelength range of the laser diode. A simple, practical, easily constructed direction finding device is provided which requires only one fiber for each 10 ns incremental delay. A continuously variable fiber optic delay line in a direction finding apparatus utilizes a continuously variable optical source.

It should be readily understood that many modifications and variations of the present invention are possible within the purview of the claimed invention. It is, therefore, to be understood that within the scope of the appended claims, the invention may be practiced otherwise than as specifically described.

I claim:

1. A direction finding apparatus for an RF signal comprising:

a plurality of antennae, each being disposed to receive said RF signal and each being adapted to produce a representative signal thereof;

means for producing tunable optical radiation;

a plurality of amplitude modulators, each being coupled to a different one of said plurality of antenna and to said tunable optical radiation producing means to each provide separate optical radiation signals that are modulated by a different one of said representative signals;

a plurality of optical waveguides, each being connected to a separate one of said plurality of amplitude modulators, each being fabricated from a material having anomalous dispersion for said optical radiation signals and each being dimensioned to have a discrete length; and a detector coupled to said plurality of optical waveguides.

2. The direction finding apparatus of claim 1 wherein said means for producing tunable optical radiation is a laser.

3. The direction finding apparatus of claim 2 in which said laser is a laser diode.

4. The direction finding apparatus of claim 1 further comprising:

a plurality of beamsplitters, each being interposed between a different one of said plurality of amplitude modulators and said tunable optical radiation producing means and each of said plurality of beamsplitters having a splitting ratio assuring a substantially identical intensity of optical radiation reflected therefrom.

5. The direction finding apparatus of claim 1 further comprising:

a plurality of amplitude attenuators, each being interposed between a different one of said plurality of optical waveguides and said detector, said plurality of amplitude attenuators being adapted to produce comparable intensities of optical radiations from all of said plurality of optical waveguides to said detector.

6. The direction finding apparatus of claim 1 in which the frequency of said RF signal is between 200 megahertz and 1800 megahertz.

7. The direction finding apparatus of claim 1 in which said detector is a photodiode.

8. The direction finding apparatus of claim 7 in which said photodiode is an avalanche photodiode.

9. A method for producing a variable time delay for propagation of optical radiation through a fixed length of optical fiber comprising the step of:

providing a material for the waveguide of said optical fiber which exhibits anomalous dispersion for different wavelengths of said optical radiation propagating therethrough.

10. The method of claim 9 further comprising the step of:

determining delays for said variable time delay to provide direction finding of an RF signal.

11. The method of claim 9 further comprising the step of:

varying said time delay by changing the wavelengths of said optical radiation.

12. A variable delay line for an electrical signal comprising:

an optical modulator for receiving a laser beam and for amplitude modulating said laser beam by said electrical signal to form an amplitude modulated laser beam;

an optical waveguide operably coupled to said optical modulator having a propagation delay that may be selected over a substantially continuous range by varying the wavelength of said laser beam; and an optical detector operably coupled to said optical waveguide for demodulating said amplitude modulated laser beam to generate a delayed electrical signal.

13. The variable delay line of claim 12 wherein said optical waveguide has a refractive index varying from approximately 4 to 1.5 as the wavelength of said laser beam is varied from approximately 500 nm to 600 nm.

14. The variable delay line of claim 12 further comprising a source for providing said laser beam wherein the wavelength of said laser beam may be varied substantially continuously over the range of approximately 500 nm to 600 nm.

* * * * *